United States Patent
Hohenstein (12)

(10) Patent No.: US 6,440,497 B1
(45) Date of Patent: Aug. 27, 2002

(54) PRINTED AUDIO LAYER FOR PACKAGING, SPORTING EQUIPMENT AND TOYS

(76) Inventor: Donald Giles Hohenstein, 1031 Oak Ridge Farm Rd., Mooresville, NC (US) 28115

(*) Notice: Subject to any disclaimer, the term of this patent is extended or adjusted under 35 U.S.C. 154(b) by 0 days.

(21) Appl. No.: 09/580,439

(22) Filed: May 30, 2000

Related U.S. Application Data

(60) Provisional application No. 60/136,801, filed on May 29, 1999.

(51) Int. Cl.[7] .................................................. B05D 5/00
(52) U.S. Cl. ........................ 427/256; 427/280; 427/288
(58) Field of Search ................................ 427/256, 261, 427/262, 280, 288; 101/129, 170, 490, 494

(56) References Cited

U.S. PATENT DOCUMENTS

| | | | |
|---|---|---|---|
| 2,060,287 A | * | 11/1936 | Dofsen |
| 2,369,572 A | * | 2/1945 | Kallmann |
| 3,145,026 A | | 8/1964 | Shaw .......................... 274/42 |
| 3,245,691 A | | 4/1966 | Gorman ....................... 274/42 |
| 3,269,734 A | * | 8/1966 | Ottofry |
| 3,463,303 A | | 8/1969 | Gorman ....................... 206/47 |
| 3,970,803 A | * | 7/1976 | Kinzie, Jr. et al. |
| 5,240,335 A | * | 8/1993 | Itoh et al. |
| 5,753,350 A | * | 5/1998 | Bright |

* cited by examiner

Primary Examiner—Fred J. Parker

(57) ABSTRACT

This invention relates to a Printed Audio Layer For Packaging, Sporting Equipment and Toys. As the result of this textured grooved printing process audible sound files, can be recorded then printed out through the use of printed ink compounds. The printed grooves can be played back by movement from a fingernail or tool moved perpendicular to the grooved surface to form reproducible voice recordings. During the printing of folding cartons several applications of ink based products are used each having it's own color or function. In this application, the Printed Audio Layer is applied as a functional layer with clear or tinted compounds as a final step during its printing and before the cutout stamping and stacking operation is performed. Articles such Toys, Sporting Goods, and wares may be printed with the Printed Audio Layer directly on article surfaces or as a decal where as the printed audio layer compound has been applied during the final stage of it's initial printing process and prior to being rolled for shipment where it can be applied to articles at other locations.

5 Claims, 4 Drawing Sheets

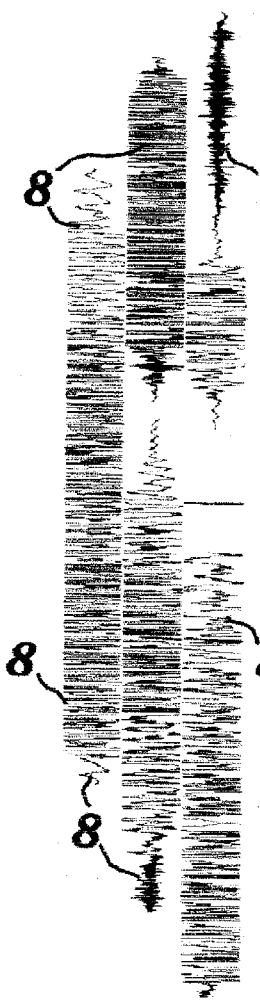
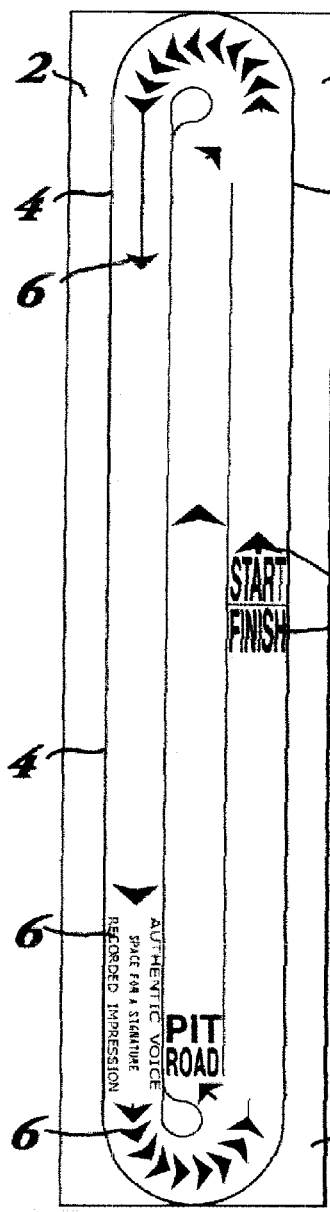
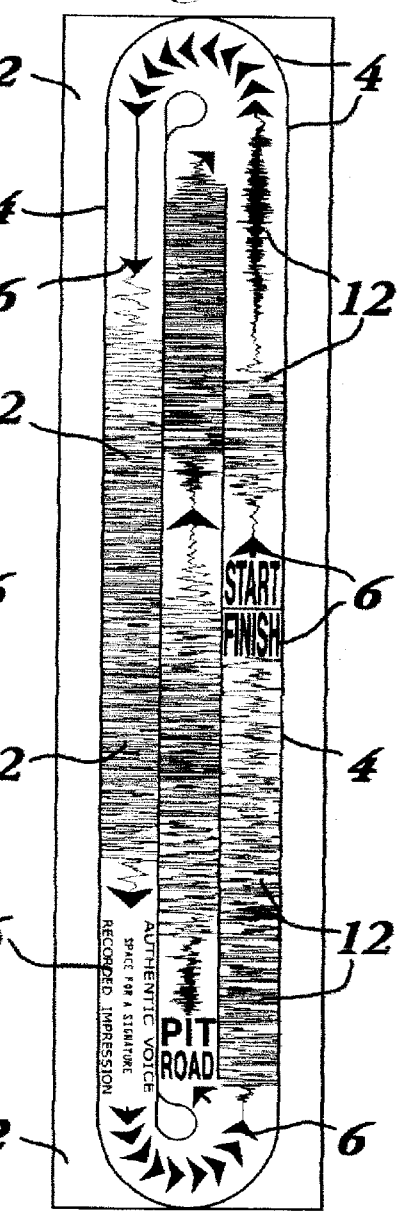

Fig. 7
Fig. 8
Fig. 9
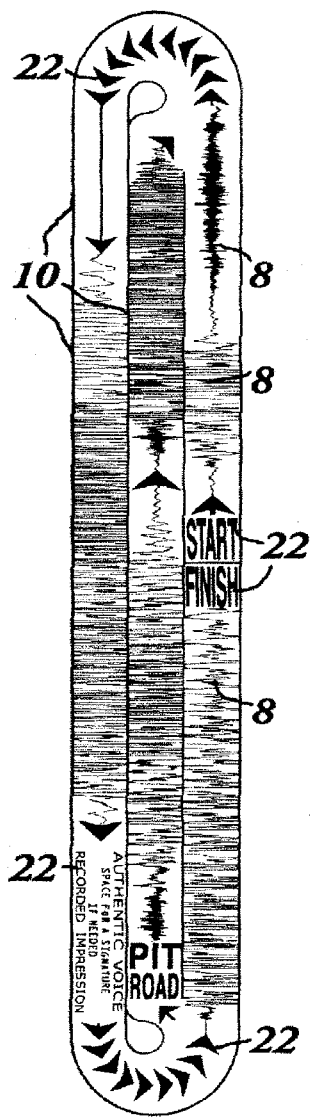
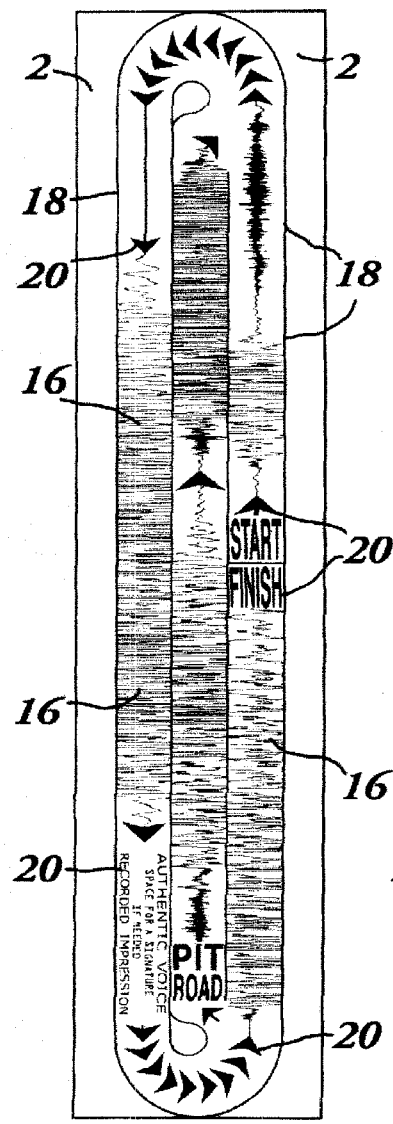
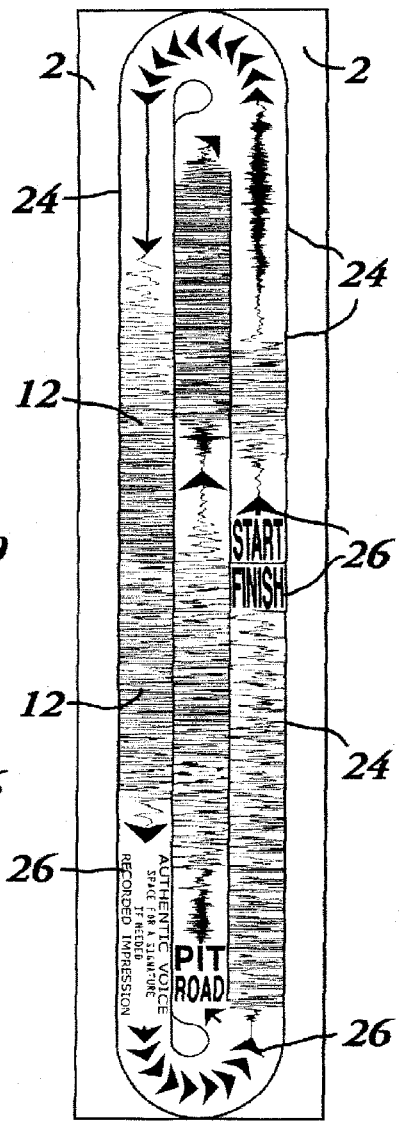

PRINTED AUDIO LAYER FOR PACKAGING, SPORTING EQUIPMENT AND TOYS

Reference is hereby made to United States provisional application No. 60/136,801 filed May 29, 1999 to inventor Donald G. Hohenstein, Sr. entitled: "Printed Audio Layer for Packaging" and to which priority is claimed for any and all disclosures made in such provisional application.

FIELD OF THE INVENTION

The invention relates to the field of product packaging and in particular to the printing of sound generating files on product packaging and containers. Audible recorded messages can be printed on product labels and packages through the use of inks. The raised grooves printed in this manner will produce audible sounds when a fingernail or tool is traced over them. Packages and containers with the printed files will vibrate and amplify the voices and sounds produced.

BACKGROUND OF THE INVENTION

By a "voice printed layer;" it is meant a suitable means for transferring reproducible voice recording to packaging by use of a single printed sound layer. However, to produce such recorded sound a combination of layers may need to be applied in a sequence that produces voice recorded messages when such a surface is traced with a tool. During standard graphics printing in the packaging industry, several colors are applied to paperboard products or plastic labeling to produce attractive package graphics. Those graphics are intended to stimulate optic nerves of consumers by use of colors which are applied to the packages surface for a more appealing visual effect and text.

In this invention, printed voice recordings will allow voice reproduction to be applied to the surface of packaging in order to create series of very fine, raised sound grooves. Short voice recordings can be traced with hand movement to produce audible sound messages which will stimulate the sense of hearing. This sound message is intended to be applied by use of printed inks and coatings that have been modified for this purpose with desirable properties which make the printing of these sound files possible.

By "sound files" it is meant those patterns of sound grooves, similar to auditory spectrograms having a series of grooves rather than a single spiral grooves as in a conventional disk record. The sound recording grooves comprise a series of lines, similar to bar coding. Such grooves are usually parallel or nearly parallel to one another and sometimes they meet at angles to form a continuous line. These sound grooves vary in depth, width, height and angle and in some cases, as between audible words or syllables, it may appear that those sound grooves may be entirely absent or their size and depth greatly reduced.

Such a voice producing layer is intended to be applied over top of graphic artwork and colors as a series of fine clear lines. However, such sound files may be applied in any color to packaging in order to have a visual disturbing affect o the packaging graphics. By containers and packages it is meant that such voice layers may be printed directly onto pressurized and non pressurized containers, as well as conventional labels which are added to containers such as bottles as well as directly over paperboard and corrugated board used to construct containers. However, this sound layer could be added as a final step to containers after they have been filled with products.

PRIOR ART

Sound producing grooves have been used on packaging through the use of fine micro grooves which have been pressed into plastics and plastic films by use of heat and pressure. Those sound producing grooves can be produced with use of a heated platen press which applies a great deal of heat and pressure to force the grooved die or dies together similar to that process used in record manufacturing.

Examples of such prior art sound groove producing processes include: U.S. Pat. No. 2,060,287 to Dofsen; U.S. Pat. No. 3,970,803 by Kinze and Wilton and U.S. Pat. No. 3,269,734 to Ottofy.

It is thought that such prior art devices have severe limitations which prohibit the use of those sound producing strips in advertising today. Prior art sound producing strips have to undergo many individual processes before they can be attached or laminated to the packages in the final step. Slitting for example requires the plastic material in the form of sheets to be cut into strips to be run through pressing dies where grooves can be applied to such strips. Also, adhesives must be applied in order to adhere sound producing components to the package which is to be made to produce the audio sounds, such as shown and described in U.S. Pat. No. 3,269,734.

Other concerns, include the lamination process used to adhere plastic strips with grooves onto the packaging. Such strips may warp and separate from the package they are adhered to when the product is on store shelves. In addition, because several different products need to be brought to the finishing process at one time, it is possible that say, an overproduction of paperboard packaging and under production of plastic audio strips for the packaging may result in a waste of paper board boxes.

The printing process of the invention described herein will address these concerns since only one step is necessary and since each package is being directly printed by the process there can be no underproduction or overproduction of products. The use of a separate piece of plastic to carry the grooves as well as adhesives to attach the plastic to the packaging are unnecessary and this results in further savings.

SUMMARY OF THE INVENTION

A process for producing printed, ink based, audio producing sound grooves is described. Deposits of ink are left on the desired packaging surface to produce a series of grooves, that are parallel or roughly parallel to one another that will reproduce sounds when a tool or fingernail is run over them in a direction or "path" that is perpendicular to direction of the grooves. Various types of printing processes and the types of packages to be used in the invention are described below.

It is an object of the invention to create voice recordings on package labels and containers without using high pressure, force and heat in order to soften the substrate.

Another object is to print sound paths and audio strips onto substrates by use of conventional print equipment without use of barrier coatings often needed to assist inks and compounds from settling out and to thus create fine line audio and sound files on product packaging.

Another object is to provide a suitable printable sound layer coating by use of fine line ink compounds which can be printed with conventional equipment over graphic layers on standard plastic and paper board packaging as well as corrugated types of product packaging.

Another object is to provide an ink compound printed dual elongated audio message by laying down a series of printed fine audio grooves, in a sound path that may be printed in combinations of straight lines and curves.

Another object is to print with inks and coatings by use of conventional printing equipment a printed zig zag sound path to form an elongated audio message by use of angled paths. Another object is to print with inks and ink compounds, which use conventional printing equipment, sound producing paths on low pressure air tight plastic snack food and paper type bags.

Another object is to print with the use of inks and ink compounds audio strips and sound path recording plastic and paperboard as well as corrugated packaging as stand up and hanging displays used for promotions.

Another object is to print with the use of inks and ink compounds and conventional printing equipment a fold out sound producing page.

Other objects will be apparent to those skilled in the art once the invention is shown and described.

DESCRIPTION OF THE DRAWINGS

FIG. 1 virtual representation of a sound producing path showing raised grooves of different size and thickness as well as non parallel sections of grooves;

FIG. 2 printable substrate with sound path outline and indicia printed by standard packaging methods;

FIG. 3 sound paths printed with raised ink color compounds on printable surface over standard visible inks;

FIG. 7 a virtual sound path file shown in sound path outline and sound path indicia;

FIG. 8 printed clear link raised sound path layer and a raised clear ink outline and printed clear ink indicia all printed together;

FIG. 9 printed on raised sound path file of clear compounds and raised color sound path outlines and color indicia;

DESCRIPTION OF THE PREFERRED EMBODIMENT

Printed ink-based sound producing grooves of the invention described herein can be printed using normal printing process techniques already being used in the industry to print the packaging and labeling on product packages. Thus this process will not require additional tooling or gearing up for production in order to add sound groove strips.

The drawings show various steps in the process. FIG. 1 shows a visual representation of a sound file that will be stored in a computer or other device that is used to store the information that describes the size and shape and spacing of the series of grooves that comprise a sound path. Unlike phonograph grooves, these types of sound producing grooves are perpendicular to the travel path of the tool or fingernail that runs over the grooves and creates sounds by the vibrations caused in this manner.

FIG. 2 shows a pathway that is printed or otherwise created on the product package. The pathway shows the user where to place the sound producing tool and the direction of travel.

FIG. 3 shows completed product where the path has been imprinted with ink that is distributed according to the pattern illustrated in FIG. 1. This results in a series of raised grooves that produce sound when a tool or nail is run across it.

Figure 4:
FIG. 4 virtual sound path representation with sound path outline.
Figure 5:
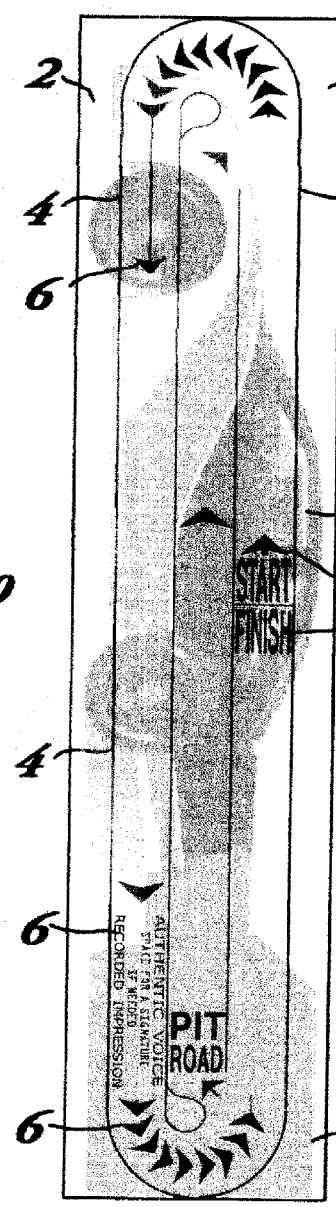
FIG. 5 multi color printed surface with sound path outline and indicia printed over graphics on the package.
Figure 6:
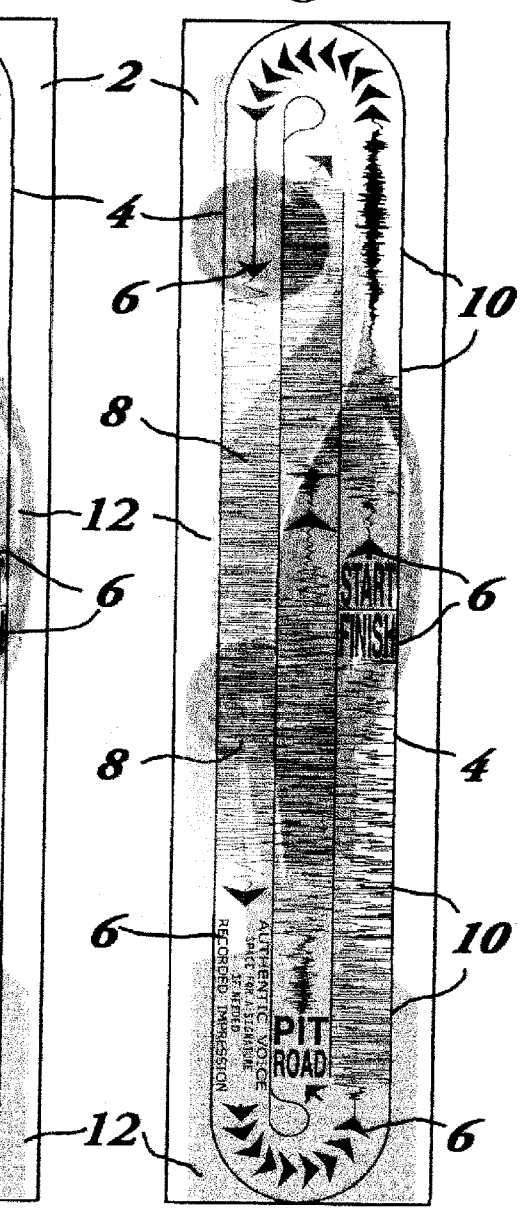
FIG. 6 multi color printed surface with sound path outline and graphics, with a clear ink compound used for the raised sound path layer to allow multi color graphics to show beneath.
Figure 10:
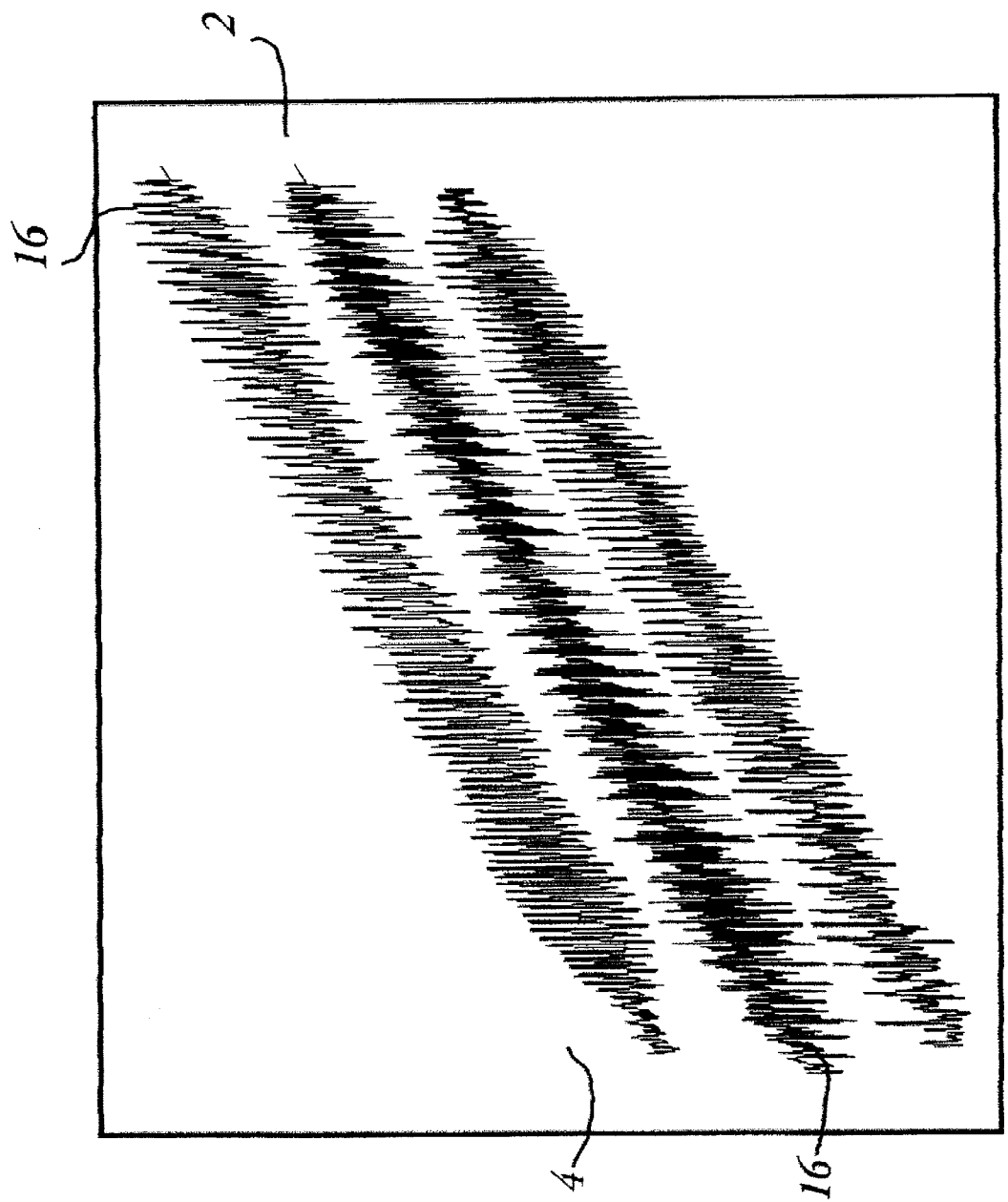
FIG. 10 swept wing style sound paths used in intaglio or flexography printing processes.

FIGS. 4–6 are similar to FIGS. 1–3 except that the ink based grooves are printed upon a product packaging containing an image already printed on the package. Such images could be of different varieties and different colors, etc. FIGS. 7–9 are similar to FIGS. 1–3 except that they are meant to illustrate the use of clear or transparent inks that can be used to create the sound producing grooves. FIG. 10 illustrates a swept wing shape of sound paths. This is the preferred shape when using intaglio or flexography printing due to the nature of the rollers used in the process. Flexography prints with rollers with the image above the roller. Sound paths need to be printed at an angle like that shown otherwise they will tend to "fog" in the printing process. The three paths shown can be part of one message, each part would be played one after the other to make the total audio message.

Item 2 in the drawings is the substrate layer, typically a cardboard packaging or similar packaging. 4 is a graphics color layer, 6 is printed sound path with direction of travel indicated. 8 is the raised up printing that represents a sound file and 10 is the outline of the sound path. This outline is also raised up.

The audio producing grooves of the present invention contains a series of audio grooves formed out of ink that are raised above the surface of the packaging layer that it is printed upon. These audio groove may be applied with standardized printing procedures described below and with the same equipment that is used to produce color graphics on paperboard, corrugated cardboard and package labeling which is applied to packaging. The process can be used with pressurized as well as non pressurized containers used to distribute beverages and other products.

"Grooves" can really mean either a depression or a raised up portion. In terms of how the invention works a groove will produce sound whether it is a "hill" or a "valley" in the ink since for every hill there is a corresponding valley and vice versa.

Each groove has a thickness, by which is meant the distance from the peak of one valley (or hill) to the next valley; i.e. spacing of the grooves. In some cases the grooves are virtually adjacent to one another. The same groove also has a "height" which means the height of the hill above the surface of the paperboard etc. or the depth of the valley. Again the term height can refer to either depth or height since the invention will still work in the same manner. The length of a groove would be the dimension measured from left to right for example item 16 in FIG. 8.

The audio strip itself (comprising a series of such grooves) also has a length and a width, the length being the distance from one of the strip to the other end and the width being the width across the strip. The width is perhaps 1", or perhaps somewhat more in most cases. The width of the strip roughly corresponds to the length of a groove (although the grooves vary widely in their length). 2000 grooves each of 0.003" in thickness will thus take up 6" in length of the sound strip.

The relationship between the height of a groove and it's thickness must remain constant in order to convey a sound with the same pitch. For most audible tones, the height of a groove is about $\frac{2}{3}$ that of the width of a groove. For fine line sound paths, the width of the grooves is about 0.003" and the height is about 50 microns or 0.002". Hence this $\frac{2}{3}$ relationship is maintained for similar tones. Note that the term "micron" referred to here is a standard used by printers and in this field, about 25.5 microns equal 0.001".

To make louder sound producing grooves, it is necessary then to increase both the height and the thickness of the grooves while maintaining the same ⅔ relationship throughout. In the example above: 2000 0.003" thick grooves took up 6" in length of the strip. To make a louder sound with the same tone might require one to increase the thickness of each groove to 0.005" and these same 2000 grooves will now take up 10" of length on a strip.

An even louder tone, known as an "aggressive" tone might require 30" in length, with a proportionate increase in thickness and height of grooves (e.g. 0.015" thick grooves) while still maintaining the ⅔ ratio of height to width. Aggressive tones would have groove thickness in the range of 0.011" and above and height in excess of 100 microns. Such grooves would preferably be printed on corrugated material. These grooves should not be played with fingernails but only with tools such as credit cards, quarters, etc.

A moderate tone, i.e. one of medium loudness would require grooves having thickness of 0.005" to 0.010" and the height of such would be 50 to 100 microns. These can be played with fingernails across the grooves, but some care must be taken to avoid breaking a nail.

One such process that may find use in the invention is the intaglio printing, where cells are actually etched in the surface of the printing roller. During the printing process those cells are filled with ink and when those cells make contact with the surface, the ink is drawn form those cells onto the paper, paperboard or plastic being printed. This ink is formulated to spread out thereby producing a high quality image with even color distribution.

A gravure process is a type of intaglio printing in which the actual image is etched into the surface of a plate or metal cylinder. The image consists of tiny cells engraved into the cylinder, there may be as many 22,500 ink wells per square inch. The cylinder rotates in a fountain of ink and a blade removes excess ink. the size and depth of each inkwell determines how much ink will be deposited on the substrate. Gravure printing may use sheet fed or web fed (rotogravure) processes.

Flexography printing is also capable of being used to print sound and voice reproducing grooves on packaging and labels. in the case of flexography, this process leaves the image being printed above the roller however multiple single images cells are not required to form the image. Flexography allows a fine line image to be produced with less jagged edges since the image produced as a result of a photographic process which does not involve the use of grouped cells like intaglio printing.

Pad printing involves the use of a stationary imaged etched ink filled die where an ink pad is mechanically moved and pressed into the die to pick up ink and transfer it to the object being printed on thus transferring the image to the object being printed. Several colors can be applied in this manner.

Screen printing is able to produce very fine lines, however there is more risk of these very fine line openings in the screen being clogged during the silk screening printing process. Silk screen fibers may be as narrow as 27 microns about 1/1000 of an inch and with the Laticula process opening sizes may be as fine as 38 microns. Automated silk screen printing on packaging may allow this fine line printing in controlled conditions where heat and humidity are monitored and cycle times are controlled as well to keep screen printing from clogging.

Waterless printing processes may also be used with the invention. Such process is able to lay down 20% or more ink than other processes that use water. In the waterless process the image is sharper because there is less bleeding also known as "diving." Diving is when printing inks hit the paperboard and they are drawn into its fibers like a sponge with water. There is some water saturation with most other printing processes and the waterless process fibers are not exposed to this additional use of water. In addition, inks used in such process, themselves do not get diluted as well.

Electron beam curable coatings is another method that may find use in the invention. A coating of such material is first applied to the product package in a soft or semi soft state. The package moves through an assembly line where it encounters a roller that has an image etched into it. Such rollers may have a section or "window" made of quartz or other type materials that has the image etched into it. As the roller encounters the coating, an electron beam is turned on thereby curing those portions of the coat that correspond to the image in the quartz. A cured image corresponding to the image in the quartz window is thereby created in the now hardened label.

Ultra violet (UV) light curable inks may also find use in this process. Such systems consist of a photo polymerization process that uses mercury vapor lamps for UV photo initiated monomer inks. UV ink chemistry can be used to adhere the coating to substrates used in flexography and screen printing.

Ink jet printing methods may also find use in practicing the invention. Ink jet printers frequently use a large number of orifices (perhaps 500 or more) and can use UV curable inks as well as other specialized inks to print on onto a variety of both porous and non porous substrates. Such printers may be designed for prototype packaging as well as short and long run printing cycles capable of printing colors as well as the sound path onto object surfaces in a single pass. Digital ink jet printing equipment has the capability to increase or decrease ink film thickness in desired areas and reduce output in other areas as well.

Other printing methods may find use in the invention are intended to be covered by the spirit of this invention including the use of offset printing. This involves the blending of inks so that the spreading out of the ink is eliminated thus leaving the ink in a series of finely raised lines on the surface of the package.

In addition, computer enhancing programs are expected to be used in the printing processes improve the overall quality of the sound producing grooves produced in the process. Changes in the height, width or spacing and the depth of grooves can be made more conveniently using such programs. Fine line widths can be mixed with moderate and aggressive line widths in order to shorten or lengthen message time as well as to vary the volume of the message thus created.

Methods of preventing the bleeding out of inks include the use of a barrier coating which prevents and restricts inks from settling down. When applying several colors in the process one or more of these colors may be used as a barrier coating which restricts the finely printed sound layer ink for settling. In addition, there will be other measures taken to insure that printed voice layer inks do not settle out. Ultra violet curable inks and UV curable inks help to control and restrict this settling.

Such methods of printing ink based audio grooves do require certain precautions to be undertaken in addition to the normal steps. The intaglio process requires inks to settle and blend together thus producing a quality printed image. For printing of sound paths this ink being used to from the ink cells must not settle and lay down in order to bind together therefore the inks must remain raised up as to form an uneven textured surface. These fine lines must remain elevated, in the 25 to 50 micron range when possible so to maintain contact with the tool or finger nail being guided across the surface so that the tool or nail will produce sounds.

Other modifications may be made to the inks used in these processes on a trial and error basis in order to further refine the technique as it is applied to the method of producing sound grooves. Additives such as fillers may be used to make the inks harder and more resistant to breaking and/or chipping when the grooves are played. Waxes and silica powders are often used in the printing industry to enhance lubricity of inks, high gloss effects, etc.

Making larger and longer sound paths allows line and space width to increase and enables the line height to be elevated as well making it possible to elevate those sound files up to 100 microns which would be used for louder and more aggressive types of broadcast sound path advertising. Such larger paths may be longer as well and in such case the user will have to make longer movements of the arms etc. in order to produce the entire sounds.

Most such sound paths are intended to be lightly traced with a tool or fingernail in order to reproduce the sounds contained in the sound files. Large sound paths of deeper depth may require a credit card or other tool since a fingernail would likely chip or break were it to be used on such.

Larger sound paths may require the use of ink deposited sound file lines on the order of about 100 microns in height (i.e. the depth of the grooves will be about 100 microns). Such sound files would be too large for normal product packaging but may find used on larger objects such as refrigerators, tractors, walls, lockers, etc. Such large paths may be first cut from product boxes and then attached to the locker door or refrigerator in question.

Die cutting of certain sections of the paperboard packaging that the sound path is printed upon will make it possible to form perforations in packages so that parts or section of the sound files can be removed from the packages and adhered to objects so that larger sound producing files can be constructed by attaching these sections to one another. By having these sound file ink deposits in the 100 micron range would make it possible to have aggressive sound path messages. Aggressive sound path recordings might require a dozen or so die cut audio message sections that would be adhered to a vertical or horizontal sections of wall board.

These types of audio messages would be played with an object such as a credit card by simply tracing over the sound path with light pressure. In some cases, 2 or 3 credit cards stacked upon one another may be preferred in order to produce sounds on a sound path that is on the order of 16 feet in length and with grooves that are of corresponding increased height. Such a sound path could transmit sounds through the halls and walls of a building.

Moderate size sound grooves would be on the order of 50–75 microns in height and those types of sound paths might find use on lockers, doors, cabinets, refrigerators, and place mats as well as hoods, doors, and fenders of automobiles and trucks.

The process described here can be used on many different types of product packages in addition to the cardboard types described. These include plastic beverage containers including the typical 1 or 2 liter bottles found in the soda industry. Many bottle labels in use nowadays are formed from several layers of inks and/or coatings, that are layered upon one anther and known as "transfer labels". Sound path files can be then be etched from this material or otherwise created out of this process.

Other processes used in the bottle industry include paper or plastic levels where sound paths are printed on the label by conventional printing process before they are mounted on the bottle. Such means include a pressure operation where a label is heated and then sent to a roller or press where sound impressions are pressed into the heated plastic as it is in a semi rigid state and to permanently retain a shape that is pressed into it at this moment.

A "non active sound path" refers to a printed sound message that is not ready to be played until the product has been purchased off the store shelf and begun to be consumed.

In the case of bottles filled with beverages the product is produced (i.e. bottled under pressure) the product (namely a beverage) inside the package is under pressure which would reduce any vibrations created when the sound path is played before the bottle is opened. The side walls of the beverage container in this case are very rigid until the bottle is opened. When the bottle is opened, the pressure is relieved and the bottle will vibrate as intended when the sound grooves are played Thus non active sound paths are those used on pressurized containers where the sound paths are not ready to be used until the product package has been opened.

Another example of a non active sound path would be one printed on a several sides of a product package (like a box) that is not ready to be used until the box has been cut open and the packaging laid flat. The box needs to be opened in order for the full message to be played since the sound path is on more than on side of the box.

Other examples of non active sound paths would include sound paths that are printed in portions so that one has to collect an entire series of sound paths, from 2 or more different packages and then link them together in order to form a complete message. Another example would be where the sound path is printed on the inside of the product package and cannot be accessed until the product has been opened. Another example might be a low pressure package such as one containing potato chips, etc. Such packages are filled with a minimal amount of air pressure so that when they are squeezed by the hand they become rigid as the air pressure is increased. Sound producing grooves on such a package would not produce sound until the product is squeezed since otherwise, the low pressure the bag is under means it will not vibrate when played.

This as opposed to, say, a carton with a six pack of beer cans, the carton itself is under no pressure and a sound producing label on this carton is considered an "active sound path" since the entire message can be played in the store before the containers are opened. In other words, the message is ready to be played without any modification of the product package.

Sound paths can be printed onto many different areas of the product packaging including in areas where trademarks and logos appear on the packaging. Thus these logos and trademarks can be enhanced by adding printed sound grooves. Such grooves will then reproduce sounds associated with the trademark, logo, or other sounds as desired.

The sound paths described herein are not intended to be used only for these locations and products. Audio messages can be applied to the doors of vending machines and such in order to allow the purchaser to run a tool over the grooves and hear product message before making a selection. Other uses include printing the sound grooves on sports equipment and/or toys.

I claim:

1. A printing process for applying a raised ink-based audio sound layer to a surface of product packaging, containers, sporting equipment, and toys, comprising;

printing on the surface a plurality of raised deposits of ink which are substantially parallel to one-another and substantially perpendicular to a length to form a grooved audio strip, said deposits of ink having a sufficient height and thickness so that reproducible voice recordings are produced when a tool or fingernail is run along the length of the audio strip.

2. The printing process according to claim 1, further comprising;

printing a plurality of audio strips on said surface to provide reproducible voice recordings.

3. The printing process according to claim 1, further comprising;

printing by a process selected from the group consisting of gravure printing, intaglio printing, screen printing, waterless printing and pad transfer printing.

4. The printing process according to claim 1, further comprising;

utilizing inks curable by ultra violet radiation or electron beam radiation.

5. The printing process according to claim 1, further comprising;

forming the raised deposits of ink on said surface having a height from about 50 microns to an excess of 100 microns", and a width from 0.003" to about 0.011".

* * * * *